(12) United States Patent
Hoshi et al.

(10) Patent No.: US 12,431,533 B2
(45) Date of Patent: Sep. 30, 2025

(54) SOLID ELECTROLYTE, AND ELECTRODE MIXTURE, SOLID ELECTROLYTE LAYER AND SOLID-STATE BATTERY, EACH USING SAME

(71) Applicant: Mitsui Mining & Smelting Co., Ltd., Tokyo (JP)

(72) Inventors: Yuji Hoshi, Ageo (JP); Hideaki Matsushima, Ageo (JP)

(73) Assignee: MITSUI MINING & SMELTING CO., LTD. (JP)

( * ) Notice: Subject to any disclaimer, the term of this patent is extended or adjusted under 35 U.S.C. 154(b) by 575 days.

(21) Appl. No.: 17/765,022

(22) PCT Filed: Oct. 20, 2020

(86) PCT No.: PCT/JP2020/039373
§ 371 (c)(1),
(2) Date: Mar. 30, 2022

(87) PCT Pub. No.: WO2021/085238
PCT Pub. Date: May 6, 2021

(65) Prior Publication Data
US 2022/0376293 A1 Nov. 24, 2022

(30) Foreign Application Priority Data
Oct. 29, 2019 (JP) .................. 2019-196778

(51) Int. Cl.
*H01M 10/0562* (2010.01)
*C01B 25/14* (2006.01)

(52) U.S. Cl.
CPC ......... *H01M 10/0562* (2013.01); *C01B 25/14* (2013.01); *C01P 2002/85* (2013.01); *C01P 2004/64* (2013.01); *C01P 2006/12* (2013.01); *C01P 2006/40* (2013.01); *H01M 2300/008* (2013.01)

(58) Field of Classification Search
CPC ......... H01M 10/0562; H01M 2300/008; C01P 2002/85; C01P 2004/64
See application file for complete search history.

(56) References Cited

U.S. PATENT DOCUMENTS

| | | |
|---|---|---|
| 9,899,701 B2 | 2/2018 | Miyashita et al. |
| 11,108,084 B2 | 8/2021 | Takahashi et al. |
| 2012/0018674 A1 | 1/2012 | Sasakura et al. |
| 2016/0293946 A1 | 10/2016 | Ritter et al. |
| 2017/0352916 A1 | 12/2017 | Miyashita et al. |
| 2019/0305371 A1 | 10/2019 | Utsuno et al. |
| 2019/0312304 A1 | 10/2019 | Uesugi et al. |
| 2020/0227776 A1 | 7/2020 | Jordy et al. |
| 2022/0416292 A1 | 12/2022 | Hoshi et al. |

FOREIGN PATENT DOCUMENTS

| | | |
|---|---|---|
| EP | 4029827 A1 | 7/2022 |
| JP | 2016-134316 A | 7/2016 |
| JP | 2016-534493 A | 11/2016 |
| JP | 2018-29058 A | 2/2018 |
| WO | 2016-009768 A1 | 1/2016 |
| WO | 2018-003333 A1 | 1/2018 |
| WO | 2019-057840 A1 | 3/2019 |

OTHER PUBLICATIONS

CN109638347 translation (Year: 2019).*
International Search Report (in English and Japanese) issued in PCTJP2020/039373, mailed Dec. 28, 2020; ISA/JP (5 pages).
International Search Report (English and Japanese) of the International Searching Authority issued in PCT/JP2020/039369, mailed Dec. 28, 2020 (total 5 pages).

* cited by examiner

*Primary Examiner* — Jane J Rhee
(74) *Attorney, Agent, or Firm* — Harness, Dickey & Pierce, P.L.C.

(57) ABSTRACT

A solid electrolyte: (compound A) a compound that has a crystal phase having an argyrodite-type crystal structure and that is represented by $Li_aPS_bX_c$, where X is at least one elemental halogen, a represents a number of 3.0 or more and 6.0 or less, b represents a number of 3.5 or more and 4.8 or less, and c represents a number of 0.1 or more and 3.0 or less; and (compound B) a compound that is represented by LiX, where X is as defined above. The compound B has a crystallite size of 25 nm or more. The solid electrolyte preferably has a BET specific surface area of 14.0 $m^2/g$ or less.

9 Claims, No Drawings

SOLID ELECTROLYTE, AND ELECTRODE MIXTURE, SOLID ELECTROLYTE LAYER AND SOLID-STATE BATTERY, EACH USING SAME

CROSS REFERENCE TO RELATED APPLICATIONS

This application is a U.S. National Phase Application under 35 U.S.C. 371 of International Application No. PCT/JP2020/039373, filed on Oct. 20, 2020, which claims priority to Japanese Patent Application No. 2019-196778, filed on Oct. 29, 2019. The entire disclosures of the above applications are expressly incorporated by reference herein.

BACKGROUND

Technical Field

The present invention relates to a solid electrolyte, and an electrode material mixture, a solid electrolyte layer and a solid-state battery containing the same.

Related Art

In recent years, a solid electrolyte has attracted attention since it can replace a liquid electrolyte used in most liquid batteries. A solid-state battery, which contains such a solid electrolyte, is expected to be put to practical use since it is safer than a liquid battery containing a flammable organic solvent and also has a high energy density.

As conventional techniques for solid electrolytes, the technique disclosed in US 2019/305371A1 is known, for example. US 2019/305371A1 discloses a sulfide solid electrolyte, which is one of solid electrolytes used in lithium ion batteries. Various crystal structures of the sulfide solid electrolyte are known, and one of them is an argyrodite-type crystal structure. US 2019/305371A1 discloses that a solid electrolyte containing a compound that has a crystal phase with an argyrodite-type crystal structure desirably contains no lithium halide, or a small amount thereof, if any. US 2019/305371A1 also discloses that a sulfide solid electrolyte may disadvantageously react with moisture in the air to thereby generate hydrogen sulfide.

It has conventionally been believed that, in a solid electrolyte containing a compound that has a crystal phase with an argyrodite-type crystal structure, lithium halide contained therein as a heterogeneous phase has an adverse effect on the lithium ion conductivity of the solid electrolyte. However, no studies have been conducted on how the lithium halide affects the generation of hydrogen sulfide from the solid electrolyte. Accordingly, it is an object of the present invention to provide a solid electrolyte that can suppress the generation of hydrogen sulfide therefrom.

SUMMARY

The inventors of the present invention have conducted in-depth studies to achieve the object described above, and surprisingly have found that, when lithium halide having a specific structure is present in a solid electrolyte, the generation of hydrogen sulfide from the solid electrolyte is suppressed. The present invention has been made based on this finding and achieves the object described above by providing a solid electrolyte including: (compound A) a compound that has a crystal phase having an argyrodite-type crystal structure and that is represented by $Li_aPS_bX_c$, where X is at least one elemental halogen, a represents a number of 3.0 or more and 6.0 or less, b represents a number of 3.5 or more and 4.8 or less, and c represents a number of 0.1 or more and 3.0 or less; and (compound B) a compound that is represented by LiX, where X is as defined above, wherein the compound B has a crystallite size of 25 nm or more.

DETAILED DESCRIPTION

Hereinafter, the present invention will be described based on a preferred embodiment thereof. The solid electrolyte according to the present invention contains a compound A, and the compound A is a compound represented by $Li_aPS_bX_c$, where X is at least one elemental halogen, a represents a number of 3.0 or more and 6.0 or less, b represents a number of 3.5 or more and 4.8 or less, and c represents a number of 0.1 or more and 3.0 or less. The compound A at room temperature (25° C.) is solid and has lithium ion conductivity. The solid electrolyte according to the present invention also contains a compound B in addition to the compound A, and the compound B is a compound represented by LiX, where X is as defined above.

The compound A in the present invention is a crystalline material that has a crystal phase with an argyrodite-type crystal structure. However, the compound A may also contain a glass component, or in other words, an amorphous component. The expression "the compound A has a crystal phase with an argyrodite-type crystal structure" means that it is sufficient that the compound A has at least a crystal phase with an argyrodite-type crystal structure, and the compound A may have a crystal phase that is different from the crystal phase with an argyrodite-type crystal structure (also referred to as "heterogeneous phase"). Of course, the compound A may not contain the heterogeneous phase. An example of a compound that constitutes the heterogeneous phase is $Li_3PS_4$.

In the compound A, the proportion of the crystal phase with an argyrodite-type crystal structure relative to all crystal phases constituting the compound A may be, for example, 10 mass % or more, 20 mass % or more, or 50 mass % or more. In particular, the compound A preferably has a crystal phase with an argyrodite-type crystal structure as a primary phase.

As used herein, the term "primary phase" refers to the phase that accounts for the highest proportion relative to the total weight of all crystal phases constituting the solid electrolyte according to the present invention. Accordingly, the content of the compound A is, for example, preferably 60 mass % or more, more preferably 70 mass % or more, even more preferably 80 mass % or more, and even further more preferably 90 mass % or more, based on all crystal phases constituting the solid electrolyte according to the present invention.

On the other hand, the term "heterogeneous phase" refers to a phase that accounts for a proportion lower than the primary phase described above relative to the total weight of all crystal phases constituting the solid electrolyte according to the present invention. Accordingly, the content of the compound B is, for example, preferably 40 mass % or less, more preferably 30 mass %, even more preferably 20 mass % or less, and even further more preferably 10 mass % or less, based on all crystal phases constituting the solid electrolyte according to the present invention.

The proportion of the crystal phase can be determined by, for example, calculating the content using X-ray diffractometry.

As used herein, the term "a crystal phase with an argyrodite-type crystal structure" refers to a crystal phase of a family of compounds derived from a mineral represented by the chemical formula: $Ag_8GeS_6$. In view of improving lithium ion conductivity, the compound A having a crystal phase with an argyrodite-type crystal structure particularly preferably has a crystal structure that belongs to the cubic crystal system.

Whether or not the solid electrolyte of the present invention contains the compound having a crystal phase with an argyrodite-type crystal structure can be determined by, for example, XRD analysis. Specifically, in an X-ray diffraction pattern obtained through analysis using an X-ray diffractometers that uses CuKα1 rays, the crystal phase with an argyrodite-type crystal structure has characteristic peaks at $2\theta=15.34°\pm1.00°$, $17.74°\pm1.00°$, $25.19°\pm1.00°$, $29.62°\pm1.00°$, $30.97°\pm1.00°$, $44.37°\pm1.00°$, $47.22°\pm1.00°$, and $51.70°\pm1.00°$. Furthermore, the crystal phase with an argyrodite-type crystal structure also has characteristic peaks at, for example, $2\theta=54.26°\pm1.00°$, $58.35°\pm1.00°$, $60.72°\pm1.00°$, $61.50°\pm1.00°$, $70.46°\pm1.00°$, and $72.61°\pm1.00°$. The term "peak" as used herein means the highest point of a peak. Each peak is preferably present independently without overlapping other peaks.

The crystal phase with an argyrodite-type crystal structure constituting the compound A in the solid electrolyte according to the present invention preferably serves as the primary phase among all crystal phases. On the other hand, the compound B preferably serves as a secondary phase in the solid electrolyte according to the present invention, and is a material of a heterogeneous phase that is different from the crystal phase with an argyrodite-type crystal structure. Accordingly, when the solid electrolyte according to the present invention is subjected to X-ray diffractometry, at least a crystal phase with an argyrodite-type crystal structure and a crystal phase derived from the compound B are observed.

In the solid electrolyte according to the present invention, the crystallite size of the compound B is preferably controlled. The controlled crystallite size of the compound B leads to suppression of the generation of hydrogen sulfide from the solid electrolyte according to the present invention. The inventors of the present invention consider that the reason for this is as follows.

As described above, the solid electrolyte according to the present invention contains the compound A. When the compound A is produced, the compound B may inevitably coexist in the produced compound A. Generally speaking, the compound B is considered to be a compound that is highly hygroscopic and is therefore capable of absorbing moisture in the air. The inventors of the present invention have conducted further studies by focusing on this point, and have found that, when a compound B that has a crystallite size larger than a specific value is present in the compound A as a heterogeneous phase, the hygroscopic effect of the compound B further increases. As a result, a reaction between the compound A and moisture in the air is unlikely to occur, and thus the generation of hydrogen sulfide from the solid electrolyte according to the present invention is suppressed.

In the solid electrolyte according to the present invention, the compound B preferably has a crystallite size of 25 nm or more, more preferably 26 nm or more, and even more preferably 27 nm or more, in view of more significantly exhibiting the advantageous effect described above.

In the solid electrolyte according to the present invention, the controlled crystallite size of the compound B can also lead to improvement in the lithium ion conductivity. The inventors of the present invention consider that the reason for this is as follows. In view of improving the lithium ion conductivity of the solid electrolyte, the compound B is present desirably in an amount as small as possible, and ideally, the compound B is not present. However, in the currently most widely used method for producing the compound A, it is not easy to eliminate the presence of the compound B in the produced compound A. To address this, the inventors of the present invention have conducted various studies on a means for increasing the lithium ion conductivity even when the compound B coexists as a heterogeneous phase in the compound A having a crystal phase with an argyrodite-type crystal structure. As a result, the inventors of the present invention have found that, in a solid electrolyte in which the crystallite size of the compound B as a heterogeneous phase is controlled to a small value, the path for lithium ion conduction is not obstructed to thereby improve the lithium ion conductivity of the solid electrolyte.

In the solid electrolyte according to the present invention, the compound B preferably has a crystallite size of 70 nm or less, more preferably less than 68 nm, and even more preferably 67 nm or less, in view of more significantly exhibiting the advantageous effect described above.

The crystallite size of the compound B contained in the solid electrolyte according to the present invention can be determined using X-ray diffractometry. A specific method thereof will be described in detail in Examples given later.

The solid electrolyte according to the present invention can exhibit a lithium ion conductivity at room temperature (25° C.) as high as preferably 4.0 mS/cm or more, more preferably 4.2 mS/cm or more, and even more preferably 4.5 mS/cm or more, as a result of controlling the crystallite size of the compound B contained in the solid electrolyte. The lithium ion conductivity of the solid electrolyte can be measured using the method described in Examples given later.

As described above, the compound B contained as a heterogeneous phase in the solid electrolyte according to the present invention is represented by LiX. X represents at least one elemental halogen. X may be, for example, fluorine, chlorine, bromine, or iodine. In the case where X is a single kind of element, the compound B may be represented by LiF, LiCl, LiBr, or LiI, for example. In the case where X is composed of two kinds of element, the compound B is represented by $LiX^1_yX^2_z$, where $X^1$ and $X^2$ represent different elemental halogens, and y and z represent numbers that are greater than 0 and satisfy y+z=1. Examples of the combination of $X^1$ and $X^2$ include a combination of Cl and Br (or in other words, $LiCl_yBr_z$), a combination of Cl and I, and a combination of Br and I. In the case where X is composed of three kinds of element, the compound B is represented by $LiX^1_yX^2_zX^3_v$, where $X^1$, $X^2$, and $X^3$ represent different elemental halogens, and y, z, and v represent numbers that are greater than 0 and satisfy y+z+v=1. An example of the combination of $X^1$, $X^2$, and $X^3$ is a combination of Cl, Br, and I. The solid electrolyte according to the present invention may contain only a single kind of compound B or two or more kinds of compound B. In the case where the solid electrolyte according to the present invention contains only a single kind of compound B, the compound B preferably has a crystallite size within the above-described range. On the other hand, in the case where the solid electrolyte according to the present invention contains two or more kinds of compound B, it is preferable that at least one compound as the compound B have a crystallite size within the above-described range, and it is more preferable that all compounds as the compound B have a crystallite size within the above-described range.

As described above, the compound A contained in the solid electrolyte according to the present invention is represented by $Li_aPS_bX_c$. As used herein, the expression "the compound A is represented by $Li_aPS_bX_c$" encompasses a compound A that is prepared from starting materials so as to satisfy $Li_aPS_bX_c$. In the compositional formula, the subscript "a", which represents the molar ratio of elemental lithium (Li), is preferably, for example, a number of 3.0 or more and 6.0 or less, more preferably a number of 3.2 or more and 5.8 or less, and even more preferably a number of 3.4 or more and 5.4 or less. The subscript "a" may be a number less than 5.4.

In the compositional formula, the subscript "b", which represents the molar ratio of elemental sulfur (S), is preferably, for example, a number of 3.5 or more and 4.8 or less, more preferably a number of 3.8 or more and 4.6 or less, and even more preferably a number of 4.0 or more and 4.4 or less. The subscript "b" may be a number less than 4.4.

In the compositional formula, the subscript "c" is preferably, for example, a number of 0.1 or more and 3.0 or less, more preferably a number of 0.2 or more and 2.5 or less, and even more preferably 0.4 or more and 2.0 or less. When a, b, and c are within the above-described respective ranges, the compound A exhibits a sufficiently high lithium ion conductivity. In the compositional formula, X represents at least one elemental halogen. In the case where X is a single kind of element, the compound A may be represented by $Li_aPS_bF_c$, $Li_aPS_bCl_c$, $Li_aPS_bBr_c$, or $Li_aPS_bI_c$, for example. In the case where X is composed of two kinds of element, the compound A is represented by $Li_aPS_bX^1_yX^2_z$, where $X^1$ and $X^2$ represent different elemental halogens, and y and z represent numbers that are greater than 0 and satisfy c=y+z. Examples of the combination of $X^1$ and $X^2$ include a combination of Cl and Br, a combination of Cl and I, and a combination of Br and I. In the case where X is composed of three kinds of element, the compound A is represented by $Li_aPS_bX^1_yX^2_zX^3_v$, where $X^1$, $X^2$, and $X^3$ represent different elemental halogens, and y, z, and v represent numbers that are greater than 0 and satisfy c=y+z+v. An example of the combination of $X^1$, $X^2$, and $X^3$ is a combination of Cl, Br, and I. The solid electrolyte according to the present invention may contain a single kind of compound A or two or more kinds of compound A.

In the present invention, the compound A obtained by using starting materials in amounts for satisfying $Li_aPS_bX_c$ may contain an element other than elemental lithium (Li), elemental phosphorus (P), elemental sulfur (S), or elemental halogen (X). For example, the elemental lithium (Li) may be partially replaced by another elemental alkali metal, the elemental phosphorus (P) may be partially replaced by another elemental pnictogen, or the elemental sulfur (S) may be partially replaced by another elemental chalcogen.

In the present invention, it is also preferable to control the crystallite size of the compound A, in addition to controlling the crystallite size of the compound B. The controlled crystallite size of the compound A leads to further improvement in the lithium ion conductivity of the solid electrolyte according to the present invention. In the solid electrolyte according to the present invention, the compound A preferably has a crystallite size of, for example, 50 nm or more, more preferably 100 nm or more, and even more preferably 300 nm or more, in view of more significantly exhibiting such an advantageous effect. On the other hand, the compound A may have a crystallite size of, for example, 800 nm or less, 600 nm or less, or 400 nm or less. When the crystallite size of the compound A is within the above-described range, the lithium ion conductivity of the solid electrolyte according to the present invention can be sufficiently increased.

In the case where the solid electrolyte according to the present invention contains only a single kind of compound A, the compound A preferably has a crystallite size within the above-described range. On the other hand, in the case where the solid electrolyte according to the present invention contains two or more kinds of compound A, all compounds as the compound A preferably have a crystallite size within the above-described range.

The crystallite size of the compound A contained in the solid electrolyte according to the present invention can be determined by performing X-ray diffractometry. A specific method will be described in detail in Examples given later.

The solid electrolyte according to the present invention may contain, for example, impurities in addition to the compound A and the compound B. In view of small influence on the performance, the amount of impurities contained in the solid electrolyte may be, for example, less than 5 mol %, preferably less than 3 mol %, and more preferably less than 1 mol %.

In view of further suppressing the generation of hydrogen sulfide, the solid electrolyte according to the present invention preferably has a BET specific surface area of 14.0 $m^2/g$ or less, more preferably 13.5 $m^2/g$ or less, and even more preferably 13.0 $m^2/g$ or less. The smaller the BET specific surface area is, the more preferable it is, in view of suppressing the generation of hydrogen sulfide. When the BET specific surface area is preferably 1.5 $m^2/g$ or more, more preferably 2.0 $m^2/g$ or more, and even more preferably 2.5 $m^2/g$, the generation of hydrogen sulfide can be sufficiently suppressed. The BET specific surface area within the above-described range can be achieved by controlling, for example, the particle size of the solid electrolyte. The method for measuring BET specific surface area will be described in detail in Examples given later.

The solid electrolyte according to the present invention is in the form of a powder, which is a mass of particles. For example, the particle size of the solid electrolyte according to the present invention is preferably 0.7 µm or more, more preferably 0.75 µm or more, and even more preferably 0.79 µm or more, in terms of 50th percentile volume-weighted particle size, $D_{50}$, as determined by laser diffraction scattering particle size distribution analysis. For example, the volume-weighted particle size $D_{50}$ is preferably 10.0 µm or less, more preferably 8.5 µm or less, and even more preferably 7.0 µm or less. When the volume-weighted particle size $D_{50}$ of the solid electrolyte according to the present invention falls within the lower limit as described above, the generation of hydrogen sulfide from the solid electrolyte can be effectively suppressed. In addition, it is possible to suppress an increase in the overall surface area of the solid electrolyte powder and thus to avoid the problems of an increase in resistance as well as difficulties with mixing with an active material. On the other hand, when the volume-weighted particle size $D_{50}$ of the solid electrolyte according to the present invention falls within the upper limit as described above, the number of the contact points between solid electrolyte particles and the contact area therebetween increase, and thus the lithium ion conductivity can be effectively improved. In addition, when the solid electrolyte according to the present invention having such a $D_{50}$ is used in combination with another solid electrolyte, the solid electrolyte according to the present invention can advantageously easily fit into the interstices between particles of the other solid electrolyte.

In relation to the $D_{50}$ described above, the solid electrolyte according to the present invention preferably has a 10th percentile volume-weighted particle size, $D_{10}$, of 5.0 μm or less, more preferably 3.5 μm or less, and even more preferably 2.0 μm or less, as determined by laser diffraction scattering particle size distribution analysis. For example, the volume-weighted particle size $D_{10}$ is preferably 0.2 μm or more, more preferably 0.3 μm or more, and even more preferably 0.4 μm or more.

The solid electrolyte according to the present invention preferably has a 95th percentile volume-weighted particle size, $D_{95}$, of 40 μm or less, more preferably 30 μm or less, and even more preferably 20 μm or less, as determined by laser diffraction scattering particle size distribution analysis. For example, the volume-weighted particle size $D_{95}$ is preferably 1.5 μm or more, more preferably 2.0 μm or more, and even more preferably 2.5 μm or more.

When the volume-weighted particle sizes $D_{10}$ and/or $D_{95}$ falls within the above-described respective ranges, the generation of hydrogen sulfide from the solid electrolyte can be more effectively suppressed, and also the number of the contact points between solid electrolyte particles and the contact area therebetween can increase to thereby more effectively improve the lithium ion conductivity.

The solid electrolyte according to the present invention can be produced preferably using the method described below. A lithium source compound, a phosphorus source compound, a sulfur source compound, and a halogen source compound can be used as starting materials. As the lithium source compound, lithium sulfide ($Li_2S$) can be used, for example. As the phosphorus source compound, phosphorus pentasulfide ($P_2S_5$) can be used, for example. When a sulfide is used as the lithium source compound and/or the phosphorus source compound, the sulfide can also serves as the sulfur source compound. As the halogen source compound, the compound B (LiX) can be used. These starting materials are mixed at a predetermined molar ratio between elemental lithium, elemental phosphorus, elemental sulfur, and elemental halogen. Then, the mixture of the starting materials is calcined under an inert atmosphere or under an atmosphere that contains hydrogen sulfide gas to thereby obtain a compound that is represented by $Li_aPS_bX_c$ and has a crystal phase with an argyrodite-type crystal structure. The atmosphere that contains hydrogen sulfide gas may be 100% hydrogen sulfide gas or a mixed gas of hydrogen sulfide gas and an inert gas such as argon. The calcination temperature is preferably 350° C. or more and 550° C. or less, for example. The duration of keeping this calcination temperature is preferably 0.5 hours or more and 20 hours or less, for example.

A solid electrolyte containing the compound A is obtained by the method described above. In the solid electrolyte, a small amount of compound B coexists. By performing an operation of controlling the crystallite size of the compound B, the generation of hydrogen sulfide from the solid electrolyte can be suppressed. As a result of studies conducted by the inventors of the present invention, it has been found that it is advantageous to subject the solid electrolyte to predetermined pulverization in order to control the crystallite size of the compound B.

The pulverization can be performed using either a wet method or a dry method. Various types of media mills can be used in the pulverization. Examples of the media mill include a ball mill, a bead mill, a paint shaker, and a homogenizer. As dispersing media that can be used in the medium mill, balls or beads made of ceramic such as alumina or zirconia are used. The diameter of the dispersing media can be, for example, 0.1 mm or more and 50 mm or less.

In the case where the pulverization is performed using a wet method, it is preferable to use an organic solvent as a medium for dispersion in view of suppressing the generation of hydrogen sulfide, which is caused by a reaction of the solid electrolyte with water. Examples of the organic solvent include: aromatic organic solvents such as toluene, xylene, benzene, and solvent naphtha; and aliphatic organic solvents such as heptane, decane, normal hexane, cyclohexane, and mineral spirit. These organic solvents may be used singly or in a combination of two or more thereof.

A slurry is prepared by mixing the organic solvent and the solid electrolyte described above, and the slurry is subjected to wet pulverization. For example, the concentration of the solid electrolyte contained in the slurry is preferably 5 mass % or more and 50 mass % or less in view of successfully obtaining a solid electrolyte with a high lithium ion conductivity. In the wet pulverization using a media mill, the amount of the dispersing media used is preferably 5 parts by mass or more and 50 parts by mass or less per 100 parts by mass of the slurry in view of easily obtaining a solid electrolyte with a high lithium ion conductivity. In general, the duration of dispersing using a media mill is preferably 0.5 hours or more and 60 hours or less in view of easily obtaining a solid electrolyte with a high lithium ion conductivity.

In the case where the wet pulverization is performed, the degree of pulverization is preferably controlled such that the solid electrolyte that has undergone the wet pulverization preferably has a volume-weighted particle size $D_{50}$ of 0.45 μm or more, more preferably 0.50 μm or more, and even more preferably 0.55 μm or more, in view of sufficiently increasing the crystallite size of the compound B contained in the solid electrolyte to suppress the generation of hydrogen sulfide from the solid electrolyte. Also, the degree of pulverization is preferably controlled such that the solid electrolyte that has undergone the wet pulverization preferably has a volume-weighted particle size $D_{50}$ of 10 μm or less, more preferably 8.5 μm or less, and even more preferably 7.0 μm or less, in view of increasing the lithium ion conductivity of the solid electrolyte. The control of the degree of pulverization such that the solid electrolyte that has undergone the wet pulverization has a volume-weighted particle size $D_{50}$ of 10 μm or less is also preferable in view of controlling the crystallite size of the compound A contained in the solid electrolyte and thus increasing the lithium ion conductivity of the solid electrolyte.

The solid electrolyte according to the present invention obtained in the manner described above can be used as, for example, a material for a solid electrolyte layer, or a material to be contained in an electrode material mixture containing an active material. Specifically, the solid electrolyte according to the present invention can be used as a positive electrode material mixture for a positive electrode layer containing a positive electrode active material or a negative electrode material mixture for a negative electrode layer containing a negative electrode active material. Accordingly, the solid electrolyte according to the present invention can be used in a battery that includes a solid electrolyte layer, a so-called solid-state battery. More specifically, the solid electrolyte according to the present invention can be used in a lithium solid-state battery. The lithium solid-state battery may be a primary battery or a secondary battery. However, the solid electrolyte according to the present invention is particularly preferably used in a lithium secondary battery. As used herein, the term "solid-state battery" encompasses a solid-state battery that does not contain any liquid material or any gel material as the electrolyte, and also encompasses a solid-state battery that contains a liquid material or a gel material as the electrolyte in an amount of, for example, 50 mass % or less, 30 mass % or less, or 10 mass % or less.

A solid electrolyte layer in a solid-state battery can be produced using, for example, any of the following methods: a method including dripping onto a substrate a slurry containing the solid electrolyte according to the present invention, a binder, and a solvent, and spreading the slurry using a doctor blade or the like; a method including bringing the slurry into contact with a substrate and then cutting it using an air knife; a method including forming a coating film using a screen printing method or the like, and heat drying the coating film to remove the solvent. Alternatively, the solid electrolyte layer may also be produced by press-forming the powder of the solid electrolyte according to the present invention and then processing the press-formed solid electrolyte as appropriate. The solid electrolyte layer may contain another solid electrolyte in addition to the solid electrolyte according to the present invention. The solid electrolyte layer of the present invention typically has a thickness of preferably 5 μm or more and 300 μm or less, and more preferably 10 μm or more and 100 μm or less.

In view of increasing the lithium ion conductivity, the solid electrolyte layer containing the solid electrolyte according to the present invention preferably has a porosity of 50% or less, more preferably 30% or less, and even more preferably 20% or less. The porosity of the solid electrolyte layer can be adjusted by, for example, adjusting the pressure when the powder of the solid electrolyte according to the present invention is pressed into a powder compact. The pressure is preferably 20 MPa or more, for example.

The porosity can be calculated using the following mathematical relation from the true density and the apparent density of the solid electrolyte layer obtained using, for example, a liquid phase method (Archimedes method).

Porosity (%)=(True Density−Apparent Density)/True Density×100

A mixture of the solid electrolyte according to the present invention with another solid electrolyte can also be used for the solid electrolyte layer. When mixing the solid electrolyte according to the present invention with another solid electrolyte, the solid electrolyte according to the present invention can be used in combination with, for example, any of an amorphous material (glass), glass ceramic, and a crystalline material. For the case where a sulfide solid electrolyte is used as the other solid electrolyte to be mixed with the solid electrolyte according to the present invention, specific examples of the sulfide solid electrolyte include $Li_2S$—$P_2S_5$ system, $Li_4P_2S_6$, and $Li_7P_3S_{11}$. The other solid electrolyte to be combined with the solid electrolyte according to the present invention may be a non-sulfide such as an oxide solid electrolyte.

A solid-state battery includes a positive electrode layer, a negative electrode layer, and a solid electrolyte layer provided between the positive electrode layer and the negative electrode layer, and the solid electrolyte layer preferably contains the solid electrolyte according to the present invention. The shape of the solid-state battery may be, for example, laminate, cylindrical, or rectangular.

In the solid-state battery containing the solid electrolyte according to the present invention, the positive electrode material mixture contains a positive electrode active material. As the positive electrode active material, a positive electrode active material used for a lithium secondary battery can be used as appropriate, for example. Examples of the positive electrode active material include a spinel lithium transition metal compound, and a lithium metal oxide with a layered structure. The positive electrode material mixture may contain, in addition to the positive electrode active material, other materials such as a conductive assistant material.

In the solid-state battery containing the solid electrolyte according to the present invention, the negative electrode material mixture contains a negative electrode active material. As the negative electrode active material, a negative electrode active material for a lithium secondary battery can be used as appropriate, for example. Examples of the negative electrode active material include lithium metal, carbon materials such as artificial graphite, natural graphite and non-graphitizable carbon (hard carbon), lithium titanate, titanium niobium composite oxide, silicon, silicon compounds, tin, and tin compounds. The negative electrode material mixture may contain, in addition to the negative electrode active material, other materials such as a conductive assistant material.

EXAMPLES

Hereinafter, the present invention will be described in further detail by way examples. However, the scope of the present invention is not limited to the examples given below.

Example 1

$Li_2S$ powder, $P_2S_5$ powder, LiCl powder, and LiBr powder were weighed so as to satisfy a composition of $Li_{5.4}PS_{4.4}Cl_{0.8}Br_{0.8}$. These powders were pulverized and mixed using a ball mill to obtain a powder mixture. The powder mixture was calcined to obtain a lithium ion conductive sulfide as a calcined product. The calcination was performed using a tubular electric furnace. During the calcination, a hydrogen sulfide gas with a purity of 100% was allowed to flow at 1.0 L/min in the electric furnace. The calcination was performed at 490° C. for 4 hours. As a result of XRD analysis, it was confirmed that the calcined product had a crystal phase with an argyrodite-type crystal structure and a crystal phase of $LiCl_{0.5}Br_{0.5}$.

The calcined product was roughly crushed using a mortar and a pestle, and thereafter crushed using a hammer crusher to obtain a crushed product. The crushed product was mixed with a solvent to obtain a slurry with a concentration of 10 mass %. The slurry was placed in a bead mill (with zirconia beads having a diameter of 0.2 mm) and subjected to wet pulverization. The solvent used in the slurry was toluene. After the wet pulverization, the slurry was subjected to solid-liquid separation, and the solid was dried. The calcined product after drying was sieved using a sieve with a mesh size of 53 μm, to thereby obtain the intended solid electrolyte. Other conditions including the duration and energy of the pulverization were selected as appropriate according to the intended solid electrolyte.

Example 2

A solid electrolyte was obtained in the same manner as in Example 1, except that the calcination temperature, the pulverizer, the slurry concentration, and the media diameter were changed as shown in Table 1 given below.

Example 3

A solid electrolyte was obtained in the same manner as in Example 1, except that the pulverizer, the slurry concentration, and the media diameter were changed as shown in Table 1 given below.

Comparative Example 1

A solid electrolyte was obtained in the same manner as in Example 1, except that the slurry concentration and the media diameter were changed as shown in Table 1 given below.

Comparative Example 2

A solid electrolyte was obtained in the same manner as in Example 1, except that the slurry concentration and the media diameter were changed as shown in Table 1 given below.

Evaluation 1

For each of the solid electrolytes obtained in Examples and Comparative Examples, the crystallite size of the crystal phase of $Li_{5.4}PS_{4.4}Cl_{0.8}Br_{0.8}$ and the crystallite size of the crystal phase of $LiCl_{0.5}Br_{0.5}$ were determined using the method described below. Also, volume-weighted particle sizes $D_{10}$, $D_{50}$, and $D_{95}$ and BET specific surface area were determined through measurement using the methods described below. The results are shown in Table 1 given below.

Determination of Crystallite Size

Determination was performed using Smart Lab available from Rigaku Corporation. An optical system for focusing method was used. A Johansson monochromator was used on the incident side, and D/teX Ultra 250 was used as a detector. Soller slits with an angle of 5 deg were used as incident and receiving parallel slits. A non-air exposure holder was used. Settings were made as follows. Scan axis: 2θ/θ, scan range: 20 deg to 140 deg, step width: 0.01 deg, and scan speed: maximum peak height of 10000 counts or more.

Also, SRM 660a (compound name: $LaB_6$) available from NIST (National Institute of Standards and Technology) was subjected to determination under the same conditions, and used as a width standard.

Analysis was performed using PDXL 2 available from Rigaku Corporation.

The method for analysis was as follows. First, identification was performed. CIF files (Crystallographic Information Files) described below were read to identify substances. The CIF files were obtained from ICSD (inorganic crystal structure database). For the compound A, a CIF file with ICSD Collection Code 418490 was used, and for the compound B, a CIF file with ICSD Collection Code 53818 was used.

Next, intensity decomposition was performed using WPPF. For width correction, a width standard data file was selected. This file was a file obtained by obtaining XRD data determined on SRM 660a to identify it as $LaB_6$, analyzing the data in the same manner as described below, and storing the data. The peak angle and the peak width were corrected using an external standard sample. "Split Pearson VII function" was used as a model function for the peak shape. Next, "Intensity Decomposition" was selected from the "Basic" tab through "Refinement Parameter Settings"—"Method". Also, since the lattice constant varies according to the combination of X (halogen atom) in the compound B, the initial value of the lattice constant of the compound B was adjusted such that the XRD data and the calculated value were located at substantially the same position. Next, refinement was performed. In the refinement, various parameters were adjusted to reach sufficient convergence. For example, the approximate target of S value was 1.5 or less. The analyzed crystallite size was obtained from "Display"-"Analysis Result".

Determination of $D_{10}$, $D_{50}$, and $D_{95}$

By using a sample delivery controller for laser diffraction particle size distribution analyzer ("Microtrac SDC" available from Microtrac BEL Corporation), a sample (powder) was introduced into an organic solvent, and the resulting mixture at a flow rate of 50% was irradiated with ultrasonic wave of 30 W for 60 seconds a plurality of times. Thereafter, particle size distribution was determined using a laser diffraction particle size distribution analyzer "MT 3000 II" available from Microtrac BEL Corporation, and $D_{10}$, $D_{50}$ and $D_{95}$ were determined from the obtained volume-weighted particle size distribution chart. As the organic solvent, toluene was used.

Measurement of BET Specific Surface Area

A sample (powder) was heated in vacuo at 120° C. for 1 hour using a pretreatment instrument "BELPREP VAC II" available from Microtrac BEL Corporation. After that, using a specific surface area analyzer "BELSORP MINI II" available from Microtrac BEL Corporation, the specific surface area was obtained by calculating from the amount of nitrogen gas adsorbed at liquid nitrogen temperature (77 K) using a BET (Brunauer Emmett Teller) method.

Evaluation 2

For each of the solid electrolytes obtained in Examples and Comparative Examples, the amount of generated hydrogen sulfide was measured using the method described below. The results are shown in Table 1 given below.

In a glove box purged with a sufficiently dried Ar gas (dew point: −60° C. or less), 50 mg of the solid electrolyte was weighed and placed in a sealed laminate film pouch.

A 1500 cm³ glass separable flask was placed in a thermo-hygrostat chamber that was kept at room temperature (25° C.) and had an atmosphere with a dew point of −30° C. adjusted by mixing dry air and atmospheric air, and the separable flask was kept until the inside thereof became the same as the environment in the thermo-hygrostat chamber. Next, the sealed pouch containing the solid electrolyte was opened in the thermo-hygrostat chamber, and the sample was quickly transferred to the separable flask. 60 minutes later, the hydrogen sulfide concentration was measured using a hydrogen sulfide sensor (GX-2009 available from Riken Keiki Co., Ltd.), for the hydrogen sulfide generated during 60 minutes right after the transfer of the solid electrolyte to the separable flask and the sealing of the flask. Then, the volume of hydrogen sulfide was calculated from the hydrogen sulfide concentration after 60 minutes, and the amount of hydrogen sulfide generated during 60 minutes was obtained.

Evaluation 3

For each of the solid electrolytes obtained in Examples and Comparative Examples, lithium ion conductivity was measured using the method described below. The results are shown in Table 1 given below.

The solid electrolyte was subjected to uniaxial press-molding in a glove box purged with a sufficiently dried Ar gas (dew point: −60° C. or less). Furthermore, the resultant was molded at 200 MPa using a cold isostatic pressing apparatus to obtain a pellet with a diameter of 10 mm and a thickness of about 4 mm to 5 mm. A carbon paste for electrodes was applied to the upper and lower sides of the pellet, and then the resultant was heated at 180° C. for 30 minutes to obtain a sample for ion conductivity measurement. The lithium ion conductivity of the sample was measured using Solartron 1255B available from Toyo Corporation. The measurement was performed at a temperature of 25° C. and a frequency of 0.1 Hz to 1 MHz using an alternate-current impedance method.

TABLE 1

| | Calcination temp. (° C.) | Pulverizer | Slurry conc. (mass %) | Media diameter (mm) | Crystallite size (nm) Compound B | Compound A | $D_{10}$ (μm) | $D_{50}$ (μm) | $D_{95}$ (μm) | BET specific surface area ($m^2$/g) | Amount of hydrogen sulfide generated ($cm^3$/g) | Lithium ion conductivity (mS/cm) |
|---|---|---|---|---|---|---|---|---|---|---|---|---|
| Example 1 | 490 | Bead mill | 10 | 0.2 | 27.2 | 67.3 | 0.43 | 0.79 | 3.15 | 12.9 | 0.4 | 5.3 |
| Example 2 | 450 | Ball mill | 25 | 10 | 62.4 | 358.0 | 1.59 | 6.26 | 17.40 | 2.7 | 0.3 | 4.6 |
| Example 3 | 490 | Ball mill | 25 | 10 | 66.1 | 372.0 | 1.19 | 2.76 | 7.16 | 3.1 | 0.4 | 4.8 |
| Comp. Ex. 1 | 490 | Bead mill | 9 | 0.3 | 15.8 | 56.6 | 0.39 | 0.69 | 3.86 | 15.1 | 0.5 | 6.6 |
| Comp. Ex. 2 | 490 | Bead mill | 15 | 0.3 | 20.3 | 47.6 | 0.37 | 0.63 | 1.71 | 14.6 | 0.7 | 5.0 |

As can be clearly seen from the results shown in Table 1, the solid electrolytes obtained in Examples have substantially the same lithium ion conductivity as that of the solid electrolytes obtained in Comparative Examples while the generation of hydrogen sulfide therefrom is suppressed.

INDUSTRIAL APPLICABILITY

According to the present invention, a solid electrolyte that suppresses the generation of hydrogen sulfide therefrom is provided.

The invention claimed is:

1. A solid electrolyte comprising:
a compound A that comprises a crystal phase having an argyrodite-type crystal structure and that is represented by $Li_aPS_bX_c$, where X is at least one elemental halogen, a represents a number of 3.0 or more and 6.0 or less, b represents a number of 3.5 or more and 4.8 or less, and c represents a number of 0.1 or more and 3.0 or less; and
a compound B that is represented by LiX, where X is as defined above,
wherein the compound B has a crystallite size of 25 nm or more.

2. The solid electrolyte according to claim 1, wherein the solid electrolyte has a BET specific surface area of 14.0 $m^2$/g or less.

3. The solid electrolyte according to claim 1, wherein the compound B has a crystallite size of 70 nm or less.

4. The solid electrolyte according to claim 1, wherein the solid electrolyte exhibits a lithium ion conductivity at 25° C. of 4.0 mS/cm or more.

5. The solid electrolyte according to claim 1, wherein the compound A has a crystallite size of 50 nm or more.

6. The solid electrolyte according to claim 1, wherein the compound B is represented by $LiCl_yBr_z$, where y and z are numbers that satisfy y+z=1.

7. An electrode material mixture comprising:
the solid electrolyte according to claim 1; and
an active material.

8. A solid electrolyte layer comprising the solid electrolyte according to claim 1.

9. A solid-state battery comprising the solid electrolyte according to claim 1.

* * * * *